(12) United States Patent
Thomas et al.

(10) Patent No.: US 9,068,630 B2
(45) Date of Patent: Jun. 30, 2015

(54) MULTI-SPEED TRANSMISSION

(71) Applicant: FORD GLOBAL TECHNOLOGIES, LLC, Dearborn, MI (US)

(72) Inventors: Steven Gerald Thomas, Bloomfield Hills, MI (US); Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 130 days.

(21) Appl. No.: 13/733,261

(22) Filed: Jan. 3, 2013

(65) Prior Publication Data
US 2014/0187378 A1 Jul. 3, 2014

(51) Int. Cl.
*F16H 3/44* (2006.01)
*F16H 3/66* (2006.01)

(52) U.S. Cl.
CPC ............ *F16H 3/66* (2013.01); *F16H 2003/445* (2013.01); *F16H 2200/0065* (2013.01); *F16H 2200/2012* (2013.01); *F16H 2200/2046* (2013.01)

(58) Field of Classification Search
CPC ................. F16H 2200/2012; F16H 2200/2046
USPC .......... 475/275–296, 311, 317, 323, 329, 330
See application file for complete search history.

(56) References Cited

U.S. PATENT DOCUMENTS

| | | | |
|---|---|---|---|
| 6,955,627 B2 | 10/2005 | Thomas et al. | |
| 6,960,149 B2 | 11/2005 | Ziemer | |
| 7,163,484 B2 | 1/2007 | Klemen | |
| 8,137,232 B2 * | 3/2012 | Wittkopp et al. | ............. 475/280 |
| 8,177,674 B2 | 5/2012 | Baldwin | |
| 8,210,982 B2 | 7/2012 | Gumpoltsberger et al. | |
| 8,210,983 B2 | 7/2012 | Gumpoltsberger et al. | |
| 8,231,495 B2 | 7/2012 | Gumpoltsberger et al. | |
| 8,231,496 B2 | 7/2012 | Gumpoltsberger et al. | |
| 8,231,501 B2 | 7/2012 | Gumpoltsberger et al. | |
| 8,246,504 B2 | 8/2012 | Gumpoltsberger et al. | |
| 8,251,859 B2 | 8/2012 | Gumpoltsberger et al. | |
| 8,303,455 B2 | 11/2012 | Gumpoltsberger et al. | |
| 8,353,801 B2 | 1/2013 | Hart et al. | |
| 8,403,803 B2 | 3/2013 | Gumpoltsberger et al. | |
| 8,597,152 B2 | 12/2013 | Seo et al. | |
| 2011/0009229 A1 | 1/2011 | Bauknecht et al. | |
| 2011/0183807 A1 | 7/2011 | Gumpoltsberger et al. | |
| 2011/0245016 A1 | 10/2011 | Wittkopp et al. | |
| 2012/0065019 A1 | 3/2012 | Hart et al. | |
| 2012/0065020 A1 | 3/2012 | Mellet et al. | |

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

*Primary Examiner* — Tisha Lewis
(74) *Attorney, Agent, or Firm* — James Dottavio; Brooks Kushman P.C.

(57) ABSTRACT

A family of transmission gearing arrangements produces up to nine forward and one reverse speed ratios by selective engagement of three couplers in various combinations. Each disclosed transmission includes four planetary gear sets and six couplers. Three of the couplers may be brakes. Three of the couplers may selectively couple planetary elements to the input shaft.

13 Claims, 3 Drawing Sheets

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds in both forward and reverse. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. When the vehicle is at high speed, the transmission is usually operated at a low speed ratio to permit the engine to facilitate quiet, fuel efficient cruising.

Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

Figure 1:
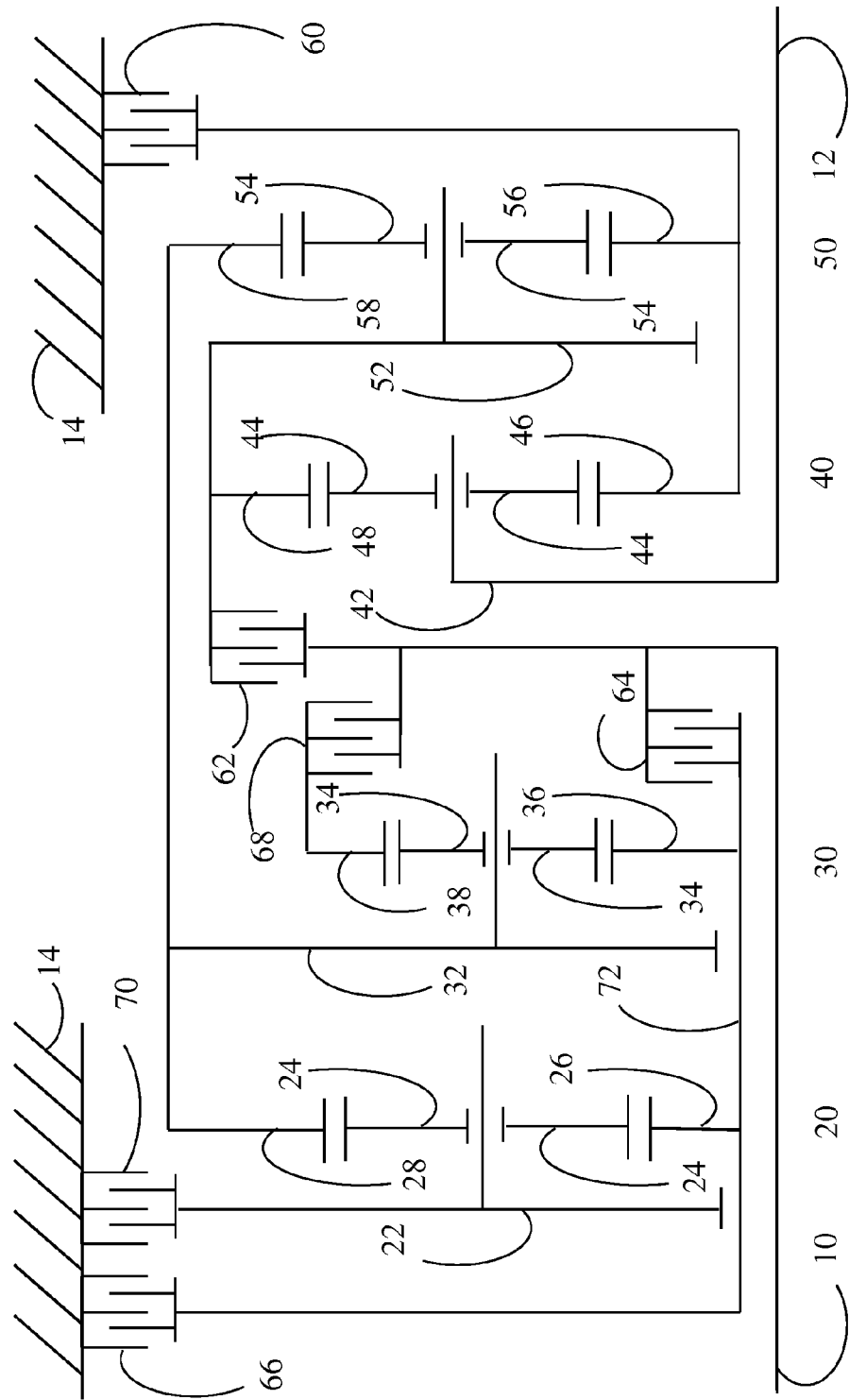
FIG. 1 is a schematic diagram of a first transmission gearing arrangement.

An example transmission is schematically illustrated in FIG. 1. The transmission utilizes four simple planetary gear sets 20, 30, 40, and 50. A simple planetary gear set is a type of fixed gearing arrangement. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. A simple planetary gear set imposes a fixed speed relationship. The speed of the carrier is constrained to be between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier. Gear sets 30, 40, and 50 are similarly structured.

A suggested ratio of gear teeth for each planetary gear set is listed in Table 1.

TABLE 1

| | |
|---|---|
| Ring 28/Sun 26 | 2.05 |
| Ring 38/Sun 36 | 1.59 |
| Ring 48/Sun 46 | 1.89 |
| Ring 58/Sun 56 | 1.89 |

In the transmission of FIG. 1, sun gear 26 is fixedly coupled to sun gear 36 by intermediate shaft 72, ring gear 28 and carrier 32 are fixedly coupled to ring gear 58, sun gear 46 is fixedly coupled to sun gear 56, ring gear 48 is fixedly coupled to carrier 52, and output shaft 12 is fixedly coupled to carrier 42. Intermediate shaft 72 is selectively held against rotation by brake 66 and selectively coupled to input shaft 10 by clutch 64. Carrier 22 is selectively held against rotation by brake 70. Input shaft 10 is selectively coupled to ring gear 38 by clutch 68 and selectively coupled to ring gear 48 and carrier 52 by clutch 62. Sun gears 46 and 56 are selectively held against rotation by brake 60. The combination of gear set 20 and brake 70 selectively impose a speed relationship between ring gear 58 and intermediate shaft 72. Specifically, intermediate shaft 72 and ring gear 58 rotate in opposite directions at proportional speeds whenever brake 70 is engaged. The combination of gear set 30 and clutch 68 selectively impose a speed relationship between ring gear 58, intermediate shaft 72, and input shaft 10. Specifically, ring gear 58 is constrained to rotate at a speed between the speeds of input shaft 10 and intermediate shaft 72 whenever clutch 68 is engaged.

As shown in Table 2, engaging the clutches and brakes in combinations of three establishes nine forward speed ratios and one reverse speed ratio between input shaft 10 and output shaft 12. An X indicates that the clutch is required to establish the speed ratio. An (X) indicates the clutch can be applied but is not required. In 4th gear, either clutch 64, brake 66, or brake 70 can be applied instead of applying clutch 68 without changing the speed ratio. When the gear sets have tooth numbers as indicated in Table 1, the speed ratios have the values indicated in Table 2.

TABLE 2

|     | 60 | 62 | 64 | 66 | 68  | 70 | Ratio | Step |
|-----|----|----|----|----|-----|----|-------|------|
| Rev | X  |    | X  |    |     | X  | −4.79 | 70%  |
| 1st | X  |    |    | X  | X   |    | 6.84  |      |
| 2nd | X  |    |    | X  | X   |    | 3.82  | 1.79 |
| 3rd | X  |    | X  |    | X   |    | 2.34  | 1.63 |
| 4th | X  | X  |    |    | (X) |    | 1.53  | 1.53 |
| 5th |    | X  | X  |    | X   |    | 1.00  | 1.53 |
| 6th |    | X  |    | X  | X   |    | 0.80  | 1.25 |
| 7th |    | X  |    |    | X   | X  | 0.70  | 1.14 |
| 8th |    | X  |    | X  |     | X  | 0.61  | 1.16 |
| 9th |    | X  | X  |    |     | X  | 0.51  | 1.19 |

Figure 2:
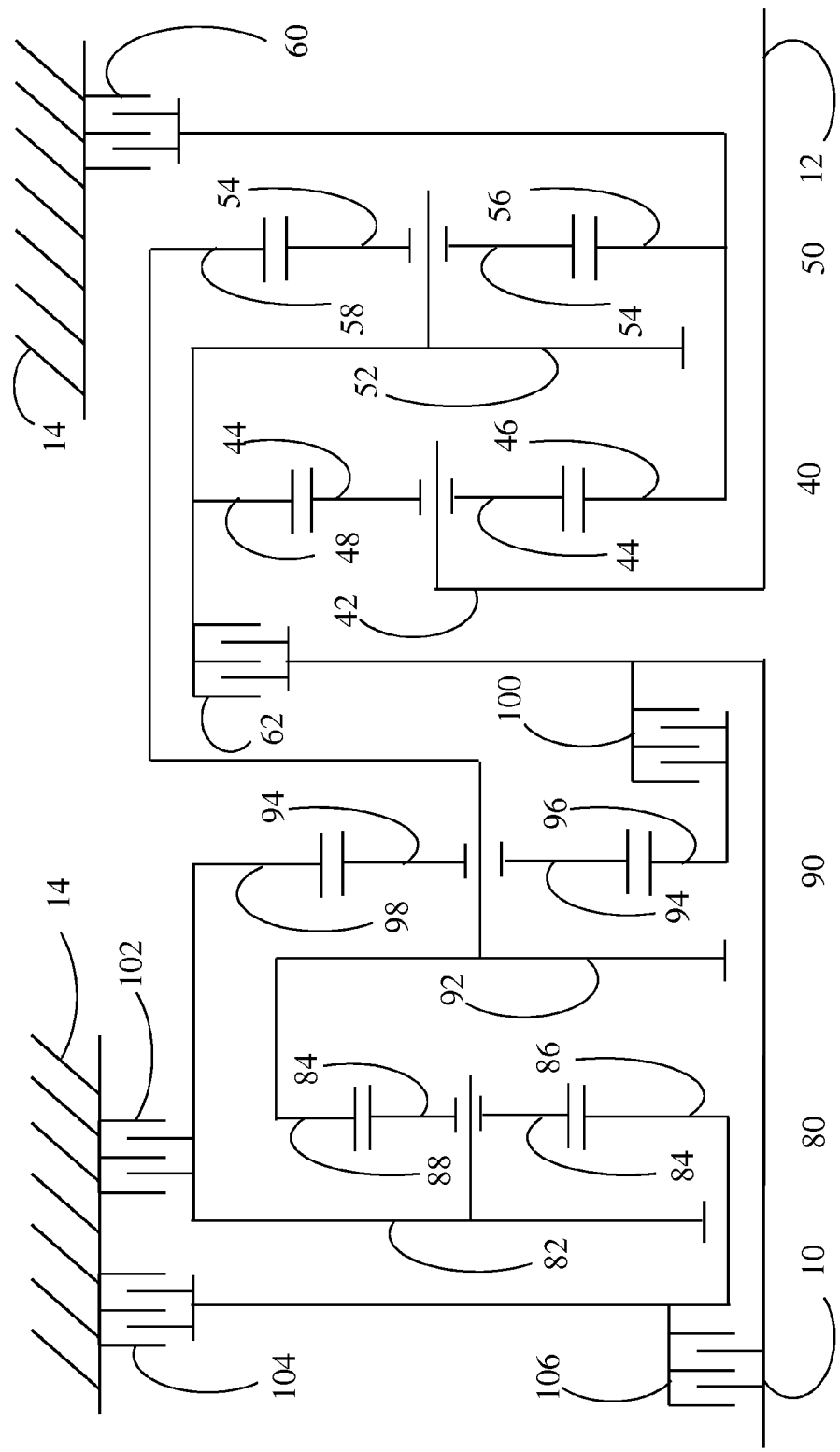
FIG. 2 is a schematic diagram of a second transmission gearing arrangement.

Another example transmission is illustrated in FIG. 2. The transmission utilizes four simple planetary gear sets 80, 90, 40, and 50. Suggested numbers of gear teeth for each planetary gear set is listed in Table 3.

TABLE 3

| Ring 88/Sun 86 | 2.05 |
| Ring 98/Sun 96 | 1.92 |
| Ring 48/Sun 46 | 1.89 |
| Ring 58/Sun 56 | 1.89 |

Carrier 82 is fixedly coupled to ring gear 98, ring gear 88 and carrier 92 are fixedly coupled to ring gear 58, sun gear 46 is fixedly coupled to sun gear 56, ring gear 48 is fixedly coupled to carrier 52, and output shaft 12 is fixedly coupled to carrier 42. Sun gear 86 is selectively held against rotation by brake 104 and selectively coupled to input shaft 10 by clutch 106. Carrier 82 and ring gear 98 are selectively held against rotation by brake 102. Input shaft 10 is selectively coupled to sun gear 96 by clutch 100 and selectively coupled to ring gear 48 and carrier 52 by clutch 62. Sun gears 46 and 56 are selectively held against rotation by brake 60. The combination of gear set 90 and clutch 100 selectively impose a speed relationship between ring gear 58, carrier 82, and input shaft 10. Specifically, ring gear 58 is constrained to rotate at a speed between the speeds of input shaft 10 and carrier 82 whenever clutch 100 is engaged.

As shown in Table 4, engaging the clutches and brakes in combinations of three establishes nine forward speed ratios and one reverse speed ratio between input shaft 10 and output shaft 12. When the gear sets have tooth numbers as indicated in Table 3, the speed ratios have the values indicated in Table 4.

TABLE 4

|     | 60 | 62 | 106 | 104 | 100 | 102 | Ratio | Step |
|-----|----|----|-----|-----|-----|-----|-------|------|
| Rev | X  |    | X   |     |     | X   | −4.79 | 70%  |
| 1st | X  |    |     |     | X   | X   | 6.84  |      |
| 2nd | X  |    |     | X   | X   |     | 3.82  | 1.79 |
| 3rd | X  |    | X   |     | X   |     | 2.34  | 1.63 |
| 4th | X  | X  |     |     | (X) |     | 1.53  | 1.53 |
| 5th |    | X  | X   |     | X   |     | 1.00  | 1.53 |
| 6th |    | X  |     | X   | X   |     | 0.80  | 1.25 |
| 7th |    | X  |     |     | X   | X   | 0.70  | 1.14 |
| 8th |    | X  |     | X   |     | X   | 0.61  | 1.16 |
| 9th |    | X  | X   |     |     | X   | 0.51  | 1.19 |

Figure 3:
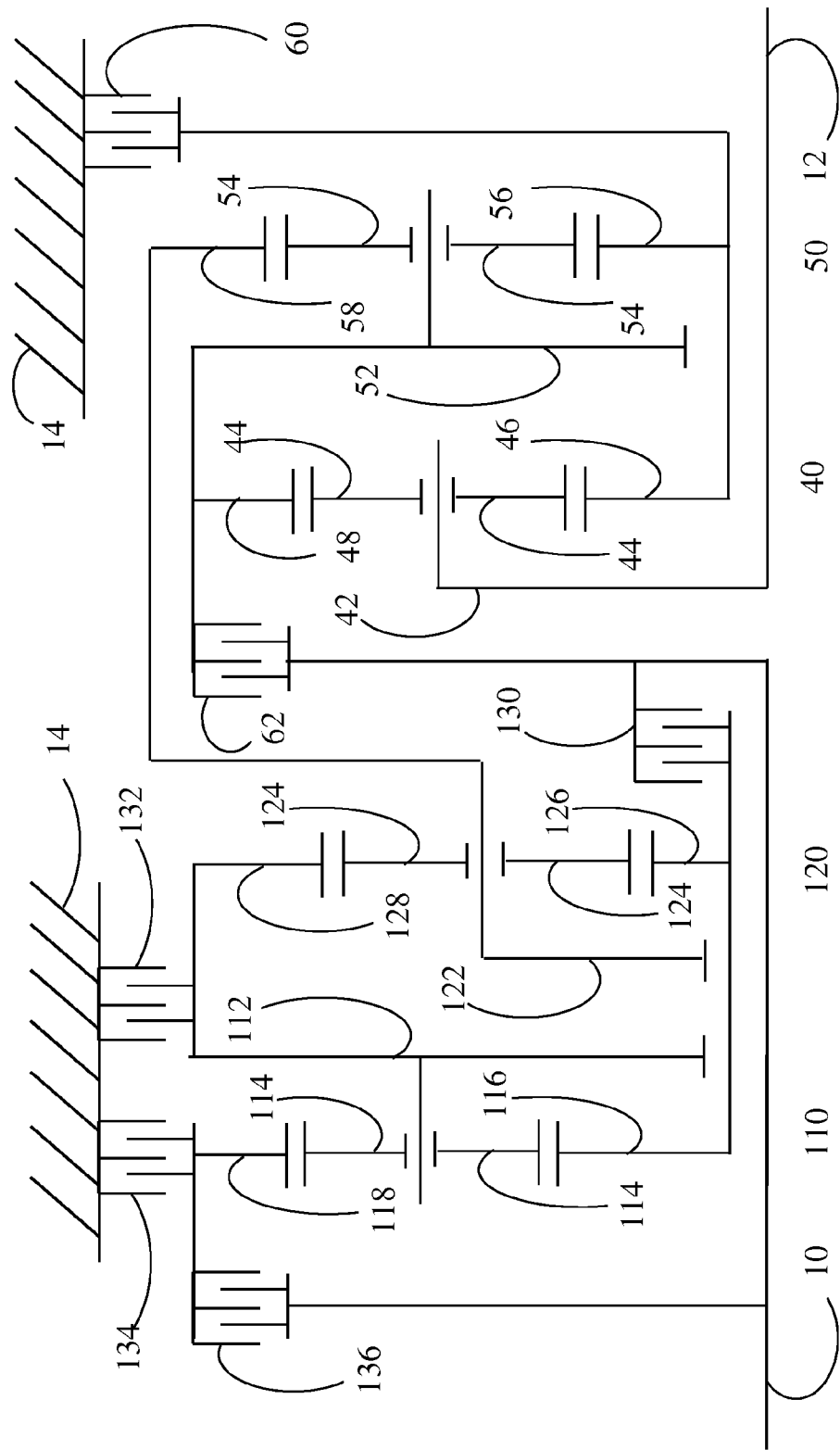
FIG. 3 is a schematic diagram of a third transmission gearing arrangement.

A third example transmission is illustrated in FIG. 3. The transmission utilizes four simple planetary gear sets 110, 120, 40, and 50. Suggested numbers of gear teeth for each planetary gear set is listed in Table 5.

TABLE 5

| Ring 88/Sun 86 | 1.50 |
| Ring 98/Sun 96 | 1.92 |
| Ring 48/Sun 46 | 1.89 |
| Ring 58/Sun 56 | 1.89 |

Carrier 112 is fixedly coupled to ring gear 128, sun gear 116 is fixedly coupled to sun gear 126, carrier 122 is fixedly coupled to ring gear 58, sun gear 46 is fixedly coupled to sun gear 56, ring gear 48 is fixedly coupled to carrier 52, and output shaft 12 is fixedly coupled to carrier 42. Ring gear 118 is selectively held against rotation by brake 134 and selectively coupled to input shaft 10 by clutch 136. Carrier 112 and ring gear 128 are selectively held against rotation by brake 132. Input shaft 10 is selectively coupled to sun gears 116 and 126 by clutch 130 and selectively coupled to ring gear 48 and carrier 52 by clutch 62. Sun gears 46 and 56 are selectively held against rotation by brake 60.

As shown in Table 6, engaging the clutches and brakes in combinations of three establishes nine forward speed ratios and one reverse speed ratio between input shaft 10 and output shaft 12. When the gear sets have tooth numbers as indicated in Table 5, the speed ratios have the values indicated in Table 6.

TABLE 6

|     | 60 | 62 | 106 | 104 | 100 | 102 | Ratio | Step |
|-----|----|----|-----|-----|-----|-----|-------|------|
| Rev | X  |    | X   |     |     | X   | −4.56 | 67%  |
| 1st | X  |    |     |     | X   | X   | 6.84  |      |
| 2nd | X  |    |     | X   | X   |     | 3.87  | 1.77 |
| 3rd | X  |    | X   |     | X   |     | 2.34  | 1.65 |
| 4th | X  | X  |     |     | (X) |     | 1.53  | 1.53 |
| 5th |    | X  | X   |     | X   |     | 1.00  | 1.53 |
| 6th |    | X  |     | X   | X   |     | 0.80  | 1.26 |
| 7th |    | X  |     |     | X   | X   | 0.70  | 1.14 |
| 8th |    | X  |     | X   |     | X   | 0.61  | 1.16 |
| 9th |    | X  | X   |     |     | X   | 0.51  | 1.20 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input shaft;
   an output shaft;
   a first planetary gear set having a first sun gear, a first ring gear, a first carrier fixedly coupled to the output shaft, and a first set of planet gears in continuous meshing engagement with the first sun gear and the first ring gear;
   a second planetary gear set having a second sun gear fixedly coupled to the first sun gear, a second ring gear, a second carrier fixedly coupled to the first ring gear, and a second set of planet gears in continuous meshing engagement with the second sun gear and the second ring gear;
   a first brake configured to selectively hold the first sun gear and the second sun gear against rotation;
   a first clutch configured to selectively couple the first ring gear and the second carrier to the input shaft;
   a third planetary gear set having a third sun gear, a third ring gear, a third carrier, and a third set of planet gears in continuous meshing engagement with the third sun gear and the third ring gear;
   a fourth planetary gear set having a fourth sun gear fixedly coupled to the third sun gear, a fourth ring gear, a fourth carrier, and a fourth set of planet gears in continuous meshing engagement with the fourth sun gear and the fourth ring gear; and
   a second clutch configured to selectively couple the third sun gear and the fourth sun gear to the input shaft.

2. The transmission of claim 1 further comprising a second brake configured to selectively hold the fourth carrier against rotation.

3. The transmission of claim 1 further comprising a third clutch configured to selectively couple the third ring gear to the input shaft.

4. The transmission of claim 1 wherein the third carrier is fixedly coupled to the second ring gear.

5. The transmission of claim 4 further comprising:
   a second brake configured to selectively hold the fourth carrier against rotation;
   a third brake configured to selectively hold the third sun gear and the fourth sun gear against rotation; and
   a third clutch configured to selectively couple the third ring gear to the input.

6. The transmission of claim 4 further comprising:
   a second brake configured to selectively hold the third ring gear and the fourth carrier against rotation;
   a third brake configured to selectively hold the fourth ring gear against rotation; and
   a third clutch configured to selectively couple the fourth ring gear to the input.

7. A transmission comprising:
   an input shaft;
   an output shaft;
   a first planetary gear set having a first sun gear, a first ring gear, a first carrier fixedly coupled to the output shaft, and a first set of planet gears in continuous meshing engagement with the first sun gear and the first ring gear;
   a second planetary gear set having a second sun gear fixedly coupled to the first sun gear, a second ring gear, a second carrier fixedly coupled to the first ring gear, and a second set of planet gears in continuous meshing engagement with the second sun gear and the second ring gear;
   a first brake configured to selectively hold the first sun gear and the second sun gear against rotation;
   a first clutch configured to selectively couple the first ring gear and the second carrier to the input shaft;
   a third planetary gear set having a third sun gear, a third ring gear, a third carrier, and a third set of planet gears in continuous meshing engagement with the third sun gear and the third ring gear;
   a fourth planetary gear set having a fourth sun gear fixedly coupled to the third sun gear, a fourth ring gear, a fourth carrier, and a fourth set of planet gears in continuous meshing engagement with the fourth sun gear and the fourth ring gear; and
   a second clutch configured to selectively couple the third ring gear to the input shaft.

8. A transmission comprising:
   an input shaft;
   an output shaft;
   an intermediate shaft;
   a first fixed gearing arrangement configured to constrain the output shaft to rotate at a speed between speeds of a first element and a second element;
   a second fixed gearing arrangement configured to constrain the second element to rotate at a speed between speeds of the first element and a third element;
   a first shiftable gearing arrangement configured to selectively constrain the third element and the intermediate shaft to rotate in opposite directions; and
   a second shiftable gearing arrangement configured to selectively constrain the third element to rotate at a speed between speeds of the input shaft and the intermediate shaft.

9. The transmission of claim 8 further comprising:
   a first brake configured to selectively hold the first element against rotation; and
   a third brake configured to selectively hold the intermediate shaft against rotation;
   a first clutch configured to selectively couple the second element to the input shaft; and
   a second clutch configured to selectively couple the input shaft to the intermediate shaft.

10. The transmission of claim 9 wherein the first fixed gearing arrangement comprises:
    a sun gear as the first element;
    a ring gear as the second element;
    a carrier fixedly coupled to the output shaft; and
    a set of planet gears in continuous meshing engagement with the sun gear and the ring gear.

11. The transmission of claim 9 wherein the second fixed gearing arrangement comprises:
    a sun gear as the first element;
    a ring gear as the third element;
    a carrier as the second element; and
    a set of planet gears in continuous meshing engagement with the sun gear and the ring gear.

12. The transmission of claim 9 wherein the first shiftable gearing arrangement comprises:

a sun gear fixedly coupled to the intermediate shaft;
a ring gear as the third element;
a carrier;
a set of planet gears in continuous meshing engagement with the sun gear and the ring gear; and
a second brake configured to selectively hold the carrier against rotation.

13. The transmission of claim 9 wherein the second shiftable gearing arrangement comprises:
a sun gear fixedly coupled to the intermediate shaft;
a ring gear;
a carrier as the third element;
a set of planet gears in continuous meshing engagement with the sun gear and the ring gear; and
a third clutch selective coupling the ring gear to the input shaft.

\* \* \* \* \*